United States Patent
Chiba et al.

[11] 3,912,428
[45] Oct. 14, 1975

[54] SHAFT SEAL

[75] Inventors: Ko Chiba; Masayuki Maruyama, both of Kashiwazaki, Japan

[73] Assignees: Nissan Motor Company Limited, Yokohama; Riken Piston Ring Kogyo Kabushiki Kaisha, Tokyo, both of Japan

[22] Filed: Sept. 21, 1973

[21] Appl. No.: 399,362

[30] Foreign Application Priority Data
Sept. 22, 1972 Japan............................ 47-110818

[52] U.S. Cl. ............... 418/104; 277/193; 277/143; 277/94
[51] Int. Cl.² ........................................ F02B 55/02
[58] Field of Search ........ 277/94, 81, 88, 193, 197, 277/192, 143, 190, DIG. 8; 418/104

[56] References Cited
UNITED STATES PATENTS

| | | | |
|---|---|---|---|
| 2,890,069 | 6/1959 | Larkin et al. ........................ 277/94 |
| 3,211,462 | 10/1965 | Durham et al. ....................... 277/94 |
| 3,415,444 | 12/1968 | Frenzel et al. .................. 418/104 X |
| 3,456,953 | 7/1969 | Hutto ................................ 277/143 |

*Primary Examiner*—Samuel B. Rothberg

[57] ABSTRACT

A shaft seal of the type for forming a seal between relatively rotatable inner and outer members in a rotary piston internal combustion engine of trochoidal construction. The shaft seal includes a first compression ring seal disposed in a seal groove formed around the inner member end compressed by the outer member to sealingly engage with the outer member, and a second compression ring seal having a radially inner beveled section and compressed by the outer member such that the radial compression of the second compression ring results in the latter urging the first compression ring in sealing engagement with one radial wall of the seal groove.

2 Claims, 5 Drawing Figures

SHAFT SEAL

The present invention relates to a shaft seal to seal a clearance between relatively rotatable inner and outer members, which is particularly effective to solve a very difficult oil sealing problem in a rotary piston internal combustion engine.

Rotary piston engines commonly comprise a three-lobed rotor disposed in an epitrochoidal housing. The rotor has a hollow center through which lubricating oil is passed, and side walls having formed therethrough center openings, through which an engine shaft having an eccentric portion extends. Working chambers are defined between the periphery of the rotor and the inner surface of the housing. It is therefore necessary to prevent flow of lubricating oil through a clearance between the center openings of the rotor and the engine shaft outwardly into the chambers. In order to restrict the flow of oil, it has been a common practice to provide ring grooves in the side walls of the rotor. The grooves receives oil seals which are urged axially outward to contact with the end walls of the housing. With this oil seal, however, leakage of lubricating oil into the chambers still occurs due to centrifugal forces created by the moving rotor acting on the lubricating oil to urge it radially outwardly past the oil seals and into the chamber. Therefore, it is desirable to seal the clearances between the center openings and the eccentric portion of the engine shaft to prevent flow of lubricating oil therethrough from the hollow center in the rotor. This has heretofore been accomplished by the provision of shaft seals between the eccentric portion and the center openings in the side walls of the rotor.

One typical prior art shaft seal assembly between the eccentric portion, or inner member, and the rotor, or outer member, rotatable relative to the eccentric portion, utilizes two compression rings. The inner member has seal grooves which open to each center opening of the rotor. The compression ring seals are installed in the seal grooves in a parallel relationship such that the outer surfaces of the rings are in sealing engagement with the adjacent inner surfaces of the center openings of the rotor, and such that the end gaps of the rings are not aligned with each other. The compression rings are designed such that they are in relatively high compression when installed to provide tight sealing engagement with the adjacent center opening inner surfaces. It is necessary to minimize the end gaps of the rings which tend to enlarge due to centrifugal forces caused by rotor motion. This, however, has interfered with the axial movement of the rings in the grooves. A prior art shaft seal assembly utilizes blow-by gas pressure to urge the rings into sealing engagement with the end walls of the grooves. If the blow-by gas pressure drops below a certain level, it becomes insufficient to urge the rings against the groove end walls, as when the engine is at rest or being decelerated, because the rings stick or bind for the reasons mentioned above. Thus, it has been encountered as a drawback of prior art shaft seals that the oil consumption increases sharply as the blow-by gas pressure drops.

It is therefore a primary object of the present invention to provide an improved shaft seal which eliminates the drawbacks of the prior art.

It is another object of the present invention to provide a shaft seal for a rotary combustion engine comprising compression rings.

It is yet another object of the present invention to provide a shaft seal for a rotary combustion engine which is simple in construction.

The above objects can be accomplished by a shaft seal of the present invention which comprises a first compression ring disposed in a seal groove in an inner member in sealing engagement with an outer member that is rotatable relative to the inner member, and a second compression ring having a radially inner beveled section disposed in the seal groove and compressed by the outer member to urge the first compression ring into sealing engagement with one end wall of the seal groove.

The nature of the present invention and the advantages thereof will be clearly apparent from the subsequent detailed description of a preferred embodiment thereof and the accompanying drawings, in which.

Although a shaft seal of the invention is herein shown and described as being employed in a rotary combustion engine, it may be advantageously employed in many other types of rotary mechanisms.

Figure 1:
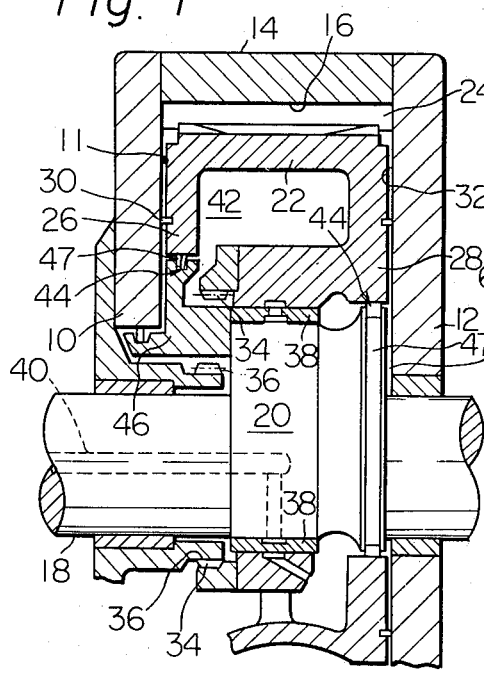
FIG. 1 is a fragmentary sectional view of a rotary combustion engine incorporating a shaft seal according to the present invention.

The rotary combustion engine illustrated fragmentarily in FIG. 1 includes an epitrochoidal housing (no numeral) comprising axially spaced end walls 10 and 12, both having substantially flat faces 11 and 13, and a peripheral wall 14 disposed between the end walls 10 and 12 to form a cavity or lobed chamber (no numeral) therebetween. An inner surface 16 of the peripheral wall 14 preferably has a multi-lobed profile which is basically an epitrochoid. An engine shaft 18 coaxially extends through the cavity defined by the housing and is journalled in bearings (no numerals) in the end walls 10 and 12. Eccentrically disposed within the housing and journalled on an eccentric portion 20 of the engine shaft 18 is a three-lobed rotor 22 having three circumferentially spaced apex portions (no numerals). Each of the apex portions has a radially movable apex seal 24 which is in continuous sealing engagement with the inner surface 16. Side walls 26 and 28 of the rotor 22 are substantially flat and have annular oil seals 30 and 32, respectively, which are urged outward from the rotor 22 into sealing engagement with the adjacent flat surfaces 11 and 13. Coaxially secured to the rotor 22 is an internal gear 34 which meshes with a fixed gear 36 coaxial with the shaft 18 and secured to the end wall 10 for producing proper relative motion of the rotor 22 within the housing. Lubricating oil is supplied to a bearing 38 by which the rotor 22 is journalled on the eccentric portion 20 through a lubricating passageway 40 and thereafter to a hollow center 42 of the rotor 22.

Figure 2:
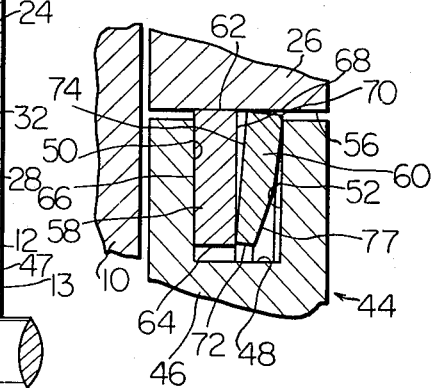
FIG. 2 is an enlarged sectional view of the shaft seal shown in FIG. 1.

Referring also to FIG. 2, a reference numeral 44 designates an embodiment of a shaft seal according to the present invention. The shaft seal 44 is utilized to form a seal between two relatively rotatable inner and outer members of the rotary combustion engine illustrated in FIG. 1. Shaft seals 44 are shown as being employed at both side walls 26 and 28 of the rotor 22, but only the seal 44 adjacent to the wall 26 is described for the sake of simplicity. An inner member adjacent to the left side wall 26 as shown is a seal disc 46 fixed to the eccentric portion 20 and rotatable therewith, and the outer member is the side wall 26 of the rotor 22 journalled on the eccentric portion 20. The inner member, the seal disc 46, is formed with a seal groove 47 (see FIGS. 1 and 2).

As best seen in FIG. 2, the seal groove 47 has axially spaced radially extending first and second end walls 50 and 52 and a bottom wall 48. The seal groove 47 opens to an inner surface 56 of a center opening (no numeral) in the face 11 of the rotor 22. The blow-by gas pressure and lubricating oil pressure sides of the shaft seal assembly 44 are on the left and on the right, respectively, as viewed in FIG. 2.

The shaft seal assembly 44 includes a first compression ring 58 and a second compression ring 60.

Figure 3:
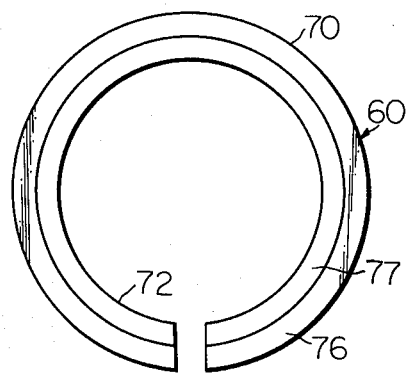
FIG. 3 is an enlarged plan view of a compression ring having a beveled section shown in its free state.
Figure 4:
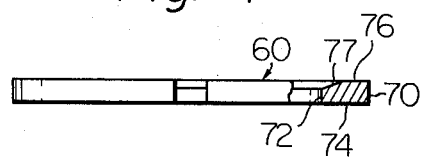
FIG. 4 is a partial side view of the compression ring of FIG. 3.

The compression ring 58 has an outer surface 62, an inner surface 64, and first and second end faces 66 and 68 respectively. The compression ring 58 is generally rectangular in profile as shown in FIG. 2. The compression ring 60 has an outer surface 70, an inner surface 72, a second end face 74 and a first end face 76 which has a radially inner beveled section 77 (see FIGS. 2, 3 and 4). The compression ring 60 is substantial flat when in its free state as best seen in FIG. 4.

The compression rings 58 and 60 should be installed in the seal groove 47 with their end gaps (no numerals) out of alignment, and with the compression ring 58 on the blow-by gas side of the shaft seal assembly 44 and the compression ring 60 on the lubricating oil pressure side thereof. The compression rings 58 and 60 are compressed by the inner surface 56 as shown in FIG. 2. With the shaft seal assembly 44 installed as shown in FIG. 2, the compression ring 58 is radially compressed so that the outer surface 62 is at all times in sealing engagement with the inner surface 56. The compression ring 60 is radially compressed and twisted about its circumference as shown so that a top edge of the second surface 74 engages with the inner surface 56. A bottom edge of the second surface 74 of the compression ring 60 engages with the second end face 68 of the ring 58. A portion of first end face 76 of the ring 60 engages with the second end wall 52.

The radial compression of the compression ring 60 results in its applying a force to the second end face 68 of the compression ring 58. This force is directed axially toward the first end wall 50 to thereby urge at all times the first end face 66 of the compression ring 58 into sealing engagement with the first end wall 50.

As has been described in the foregoing, it will now be seen that the outer surface 62 of the compression ring 58 is at all times in sealing engagement with the inner surface 56 because the compression ring 58 is in substantial compression when installed in the groove 47 and the end face 66 is at all times in sealing engagement with the end wall 50 because of the forece applied thereto by the compression ring 60.

It will also be understood that a shaft seal 44 of the invention can provide effective performance irrespective of the presence or absence of blow-by gas.

Figure 5:
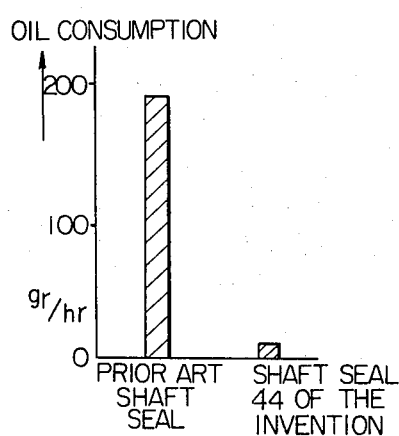
FIG. 5 is a graph showing the oil consumption of a rotary combustion engine incorporating a shaft seal of the present invention and a similar engine incorporating a prior art shaft seal.

Lubricating oil consumption tests of rotary combustion engines employing aforementioned prior art shaft seals and shaft seals 44, respectively, carried out during engine deceleration from 4,000 rpm at a lubricating oil temperature of 80°C and a coolant temperature of 80°C showed that a shaft seal 44 of the present invention was effective in reducing the oil consumption under the test conditions (see FIG. 5).

It will now be appreciated that a shaft seal of the present invention is superior to prior art shaft seals employed heretofore in rotary combustion engines.

What is claimed is:

1. A shaft seal to seal a clearance between relatively rotatable inner members, wherein said outer member has a bore rotatably receiving said inner member and said inner member has two axially spaced end walls and a bottom wall defining a seal groove opening to said bore, said shaft seal comprising: a first compression ring in said seal groove biased radially outwardly into sealing engagement with said bore; and a second compression ring seal in said seal groove having a radially inward beveled section, said second compression ring being biased radially outwardly into abutting engagement with said bore and wherein said second compression ring seal is twisted about its circumference such that a radially outer edge of the first end surface of said second compression ring engages with said bore and a radially inner edge of the first end surface of said second compression ring engages with the axial end surface of said first compression ring thereby axially urging said first compression ring seal against the adjacent one of the end walls of said seal groove to effect sealing engagement, wherein said second compression ring sea has a first end surface adjacent to an axial end surface of said first compression ring and has a second end surface which is opposite from said first end surface and has said radially inward beveled section.

2. In a rotary piston internal combustion engine having a piston and an eccentric, wherein said piston has a bore rotatably receiving said eccentric and said eccentric has two axially spaced end walls and a bottom wall defining a seal groove opening to said bore, a shaft seal comprising: a first compression ring in said seal groove biased radially outwardly into sealing engagement with said bore; and a second compression ring seal in said seal groove having a radially inward beveled section, said second compression ring biased radially outwardly into abutting engagement with said bore and wherein said second compression ring seal is twisted about its circumference such that a radially outer edge of the first end surface of said second compression ring engages with said bore and a radially inner edge of the first end surface of said second compression ring engages with the axial end surface of said first compression ring thereby axially urging said first compression ring seal against the adjacent one of the end walls of said seal groove to effect sealing engagement, wherein said second compression ring seal has a first end surface adjacent to an axial end surface of said first compression ring and has a second end surface which is opposite from said first end surface and has said radially inward beveled section.

\* \* \* \* \*